June 2, 1959 R. E. SPENCER 2,889,504
RATE MEASURING SERVOSYSTEM
Filed June 22, 1951
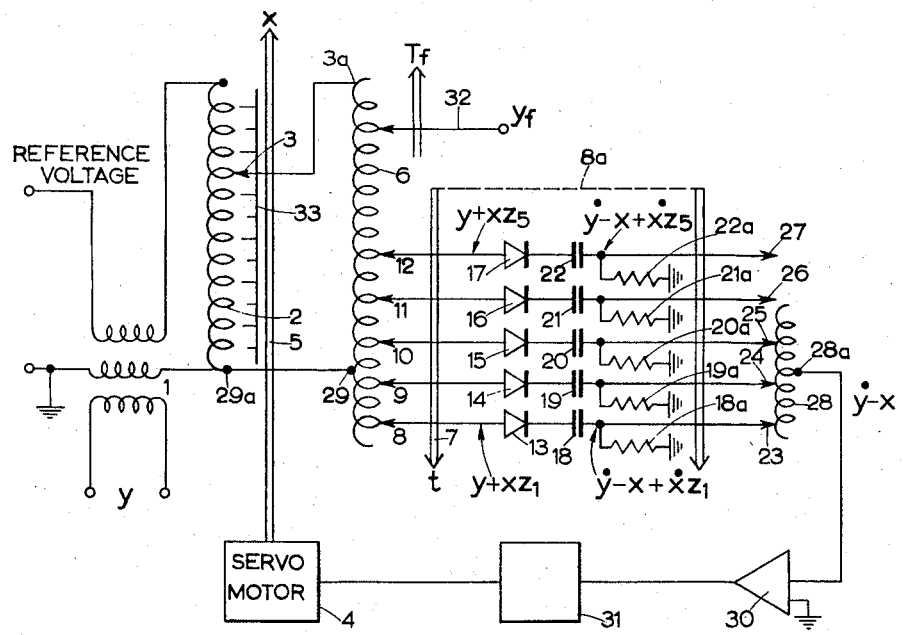
INVENTOR
R. E. Spencer
ATTORNEYS

United States Patent Office 2,889,504
Patented June 2, 1959

2,889,504

RATE MEASURING SERVOSYSTEM

Rolf Edmund Spencer, Ealing, London, England, assignor to Electric & Musical Industries Limited, Hayes, Middlesex, England, a company of Great Britain Application June 22, 1951, Serial No. 233,085

Claims priority, application Great Britain June 23, 1950

8 Claims. (Cl. 318—28)

This invention relates to rate measuring apparatus, in particular to apparatus for measuring the rate of change of amplitude of an alternating voltage.

The rate of change of a direct voltage can be determined, by employing a differentiating circuit to an accuracy of 1 part in 200 or even to 1 part in 500, if reasonable precautions are taken. However, in some cases the measurement of the rate of change of amplitude of an alternating voltage is required, and although this can be achieved by providing a rectifier preceding the direct voltage rate measuring circuit, the accuracy obtainable is less, and may be as low as 1 part in 100.

The object of the present invention is to provide improved apparatus for measuring the rate of change of an electrical voltage, which can be used where the voltage is alternating, with a view to obtaining a high degree of accuracy.

According to the present invention there is provided apparatus for measuring the rate of change of a first voltage comprising means for setting up a second voltage, means for multiplying the second voltage by a factor having a predetermined constant rate of change, differentiating means for said first voltage and for the product of said second voltage and said factor, and means responsive to the output of said differentiating means adjusting said second voltage to balance the rate of change of the product so formed with the rate of change of said first voltage, whereby the second voltage is approximately proportional to the rate of change of the first voltage.

By virtue of the present invention, the application of negative feedback techniques are made possible, and therefore if the first and second voltages are alternating voltages, rectification can be effected in a balancing circuit so that error introduced by the rectifier affects the balancing signal which is instrumental in causing the adjustment of the second voltage, rather than directly affecting the measured rate. The error introduced in such a case can be made to have negligible effect in the rate measurement.

However, if the voltage to be measured is an alternating voltage of amplitude $y$ while the second voltage is an alternating voltage of amplitude $x$ and the balancing circuit includes a rectifier preceding a differentiating circuit, the eventual comparison will be between $\dot{y}$ and the differential of the product of $x$ with the numerical factor, say $z$. This differential is $kx+\dot{x}z$ where $k$ is a constant equal to the rate of change of $z$ and the term $\dot{x}z$ has to be eliminated before balancing is effected so that $x$ shall be proportional to the rate of change of $y$.

A further object of the present invention is to eliminate the unwanted term $\dot{x}z$ in a simple manner and with this in view there is provided, in accordance with the present invention, apparatus for measuring the rate of change of amplitude of an alternating voltage of amplitude $y$ comprising means for setting up an alternating voltage of amplitude $x$, means for multiplying the voltage of amplitude $x$ by a plurality of different numerical factors $z_1, z_2 \ldots z_n$ including both positive and negative factors and each having a constant negative rate of change, means for adding each product so formed to the voltage of amplitude $y$, means for rectifying the resultant sums, differentiating means responsive to the output of the rectifying means to form the quantities $\dot{y}-kx+\dot{x}z_r$ for $r$ equals $1, 2 \ldots n$, $k$ being a constant equal to the modulus of the rate of change of $z$, means for interpolating among the quantities $\dot{y}-kx+\dot{x}z_r$ to derive the quantity $\dot{y}-kx$, and means for so adjusting $x$ as to tend to maintain the quantity $\dot{y}-kx$ substantially zero, whereby the amplitude $x$ is approximately proportional to the rate of change of the amplitude $y$.

In order that the said invention may be clearly understood and readily carried into effect, the same will now be more fully described with reference to the accompanying drawing, the single figure in which illustrates one example of the present invention.

In the apparatus illustrated in the drawing, the alternating voltage of amplitude $y$ whose rate of change of amplitude is to be measured is applied across the primary winding of a three-winding transformer 1, while an alternating reference voltage of fixed amplitude is applied across the series combination of an autotransformer 2 and the two secondary windings of the transformer 1, as shown. The reference voltage input terminal which is connected to the lower end 29a of the autotransformer 2 is grounded as shown, so that the voltage of the lower end of the autotransformer with respect to ground varies in accordance with $y$, while the voltage across the autotransformer is the reference voltage. The slider 3 of the autotransformer 2 is driven by a servo-motor 4, the drive transmission means being indicated by an arrow 5, in practice for example the slider 3 being mounted on a rotary arm driven by the motor 4 and being arranged to co-operate with fixed studs tapped on the autotransformer 2 and disposed in a circle. As will hereinafter appear, the displacement of the slider 3 is indicative of the rate of change of $y$ and the slider, or a suitable pointer connected to it, may, if desired, co-operate with a calibrated scale 33 so that the measured rate can be read off directly. The voltage set up between the slider 3 and the end 29a of the autotransformer is applied between the upper end 3a and an intermediate tapping 29 of a further autotransformer 6 and this autotransformer has several relatively closely spaced sliders driven at constant speed by suitable means indicated by the arrow 7. The autotransformer 6 is extended at its lower end beyond the tapping 29 to provide a range over which voltages can be obtained of opposite polarity to the reference voltage and thus representative of a negative voltage. Five sliders are shown for the autotransformer 6, and they are denoted by the references 8 to 12 respectively. The outputs set up at the sliders are applied respectively to rectifiers 13 to 17 which feed their outputs to differentiators denoted by condensers 18 to 22 respectively and resistors 18a to 22a respectively. The outputs of the differentiators are in turn applied to a series of sliders 23 to 27 ganged with the sliders 8 to 12 to move at the same constant speed as the latter, the ganging of the sliders being represented by a dotted line 8a. The sliders co-operate with an autotransformer 28 which is of such physical size and location that only two or three of the sliders 23 to 27 make contact with it at any one time, the sliders making contact being those fed from the sliders 8 to 12 which are at the time nearest the tap 29 on the autotransformer 6. One at least of the sliders contacting 28 is therefore fed from one of the sliders 8 to 12 on the negative side of the tap 29. The sliders 8 to 12 follow each other in repetitive succession, so that as the slider 8 moves off the lower end of the autotransformer 6, it re-engages the autotransformer behind the slider 12, and so on. Such a requirement could be realised in practice by mounting the sliders 8 to 12 on equi-angularly spaced rotary arms, on a constant speed shaft, the sliders 8 to 12 co-operating with studs tapped on the autotransformer 6 and disposed in a circle. More sliders are provided than are actually in use to feed the autotransformer 28 to allow each rectifier and differentiator to settle before the corresponding slider contacts the autotransformer 28. An output is taken from the centre tap of the autotransformer 28, which is electrically aligned with the tap 29 on the autotransformer 6, and this output forms the input signal to an amplifier 30 whose output in turn operates the servo-motor 4 in such sense as to tend to reduce said input signal to zero. If desired, weighting circuits indicated in block form at 31 may be interposed between the amplifier output and the servo-motor to weight, in some desired manner, the rate indication obtained from the apparatus.

In operation of the arrangement described, the sense of the windings of the transformer 1 are such that the voltage set up between the slider 3 and the fixed point 29 is of amplitude $x$, determined by the position of the slider 3 on the autotransformer 2. By virtue of the connection of 29 and 29a, the voltage of amplitude $x$ has added to it, with respect to ground, the voltage of amplitude $y$, so that the voltage at all points on the autotransformer 6 rises and falls in accordance with $y$, though $y$ does not affect the voltage difference between any two points on the autotransformer 6. Sliders 8 to 12 which scan the autotransformer 6 are instrumental in multiplying the voltage $x$ by a plurality of numerical factors $z_1, z_2 \ldots z_n$, $n$ being equal to 5 in the example illustrated although it will be appreciated that the number may be different. As aforesaid, all the sliders 8 to 12 scan the autotransformer 6 at a constant rate and the direction of scanning is in such sense that the products $xz_1 \ldots xz_r$ continuously decrease. Each factor $z$ has therefore a negative constant rate of change, say $-k$, where $k$ is the modulus of the rate of change. Moreover, it is arranged that the constant $k$ is absorbed as a scale factor in calibrating the apparatus so that on the scale of the apparatus the rate of change of $z$ equals $-1$, that is to say $\dot{z}=-1$. The instantaneous value of each of the numerical factors $z_1 \ldots z_5$ is determined by the instantaneous displacement of the respective slider from the tap 29. Since the autotransformer 6 is extended in the negative direction, that is the direction of displacement of the sliders 8 to 12 with respect to the autotransformer, the numerical factors $z_1 \ldots z_5$ include both positive and negative factors. Moreover, the transformer 1 is as aforesaid instrumental in applying the voltage of amplitude $y$ between the fixed point 29 and earth, and therefore the voltage fed to the rectifiers 13 to 17 have amplitudes $y+xz_r$ with respect to ground, where $r$ equals 1 to 5 in the present case. Since the resistors 18a to 22a are grounded at their lower ends, the rectifiers 13 to 17 rectify the voltage outputs $y+xz_r$ and the outputs of the rectifiers are differentiated by the differentiators 18 to 22 so that the outputs of the differentiators represent the rate of change of the quantities $y+xz_r$. That is to say the outputs of the differentiators 18 to 22 are D.C. voltages representing the quantities $\dot{y}-x+\dot{x}z_r$ (taking account of the fact that $\dot{z}=-1$ and therefore that $k=1$). The potentiometer 28 functions as an interpolating device for interpolating among those outputs from the differentiators 18 to 22 in which $z$ does not differ greatly from zero. Moreover, the fixed tap on the potentiometer 28 is located at a position corresponding to $z$ equal to zero and therefore the output obtained from the tapping 29 is representative of $\dot{y}-x$ since the term $\dot{x}z_r$ vanishes. The signal representative of the signal $\dot{y}-x$ is the input to the amplifier 30 and the output of the amplifier drives the servo-motor 4 in such sense as to maintain the output zero, that is to say the negative feedback servo-loop serves to maintain $\dot{y}-x$ equal to zero and therefore to balance the rate of change of the product $xz$ against $\dot{y}$. On the condition that the modulus of the rate of change of $z$ is unity then the instantaneous amplitude $x$ represents the instantaneous rate of change of the amplitude $y$.

The potentiometer 6 has an additional slider 32 at which is set up a voltage representative of $y+xT_f$ the anticipated value of the parameter $y$ at a future time $T_f$ represented by the displacement of the slider 32.

In some cases due to the electrical spacing of the taps on the autotransformer 2, it may not be possible to equate $\dot{y}-x$ nearly enough to zero in all cases to obtain a sufficiently high degree of accuracy. This difficulty can be reduced by providing means to set up a trial voltage by autotransformers similar to the autotransformers 2 and 6 with the addition of a further autotransformer of fine division in series with the autotransformer equivalent to 2 and driven by 5 the further autotransformer adding an increment $\Delta x$ to the factor $x$ in the trial voltage. In this case the increment $\Delta x$ is rectified and the input signal to the amplifier 30 is arranged to be the difference between $\dot{y}-x$ and $\Delta x$ so that the servo-motor 4 then operates to reduce this difference to zero. The displacement of the slider 3 then represents $x+\Delta x$ so that a rate indication of higher accuracy is obtained. Other means may alternatively be provided to obtain a correction representative of the residual rate $\dot{y}-x$.

In practice, duplicate autotransformer systems will probably be required to cover alternate ranges of values of the parameter $x$. In that case a wide overlap of the ranges covered is desirable, so that a new range can be allowed to mature through the period of its weighting function, assuming that such a function is applied, before it is taken into service.

It is to be understood that in the above description and in the following claims the symbols $x$ and $y$ are used simply for identification purposes and do not represent any particular quantities.

What I claim is:

1. Apparatus for measuring the rate of change of a first voltage comprising means for setting up a second voltage, means for multiplying the second voltage by a factor having a predetermined constant rate of change, differentiating means for said first voltage and for the product of said second voltage and said factor, and means responsive to the output of said differentiating means adjusting said second voltage to balance the rate of change of the product so formed with the rate of change of the first voltage, whereby the second voltage is approximately proportional to the rate of change of the first voltage.

2. Apparatus for measuring the rate of change of amplitude of an alternating voltage of amplitude $y$, comprising means for setting up an alternating voltage of amplitude $x$, means for multiplying the voltage of amplitude $x$ by a factor $z$ having a constant negative rate of change, means for adding the product so formed to the voltage of amplitude $y$, means for rectifying the resultant sum, differentiating means responsive to the output of said rectifying means to form a signal representing the quantity $\dot{y}-kx+\dot{x}z$, where $k$ is the constant equal to the modulus of the rate of change of $z$, means for modifying said signal to eliminate the part of it representing $\dot{x}z$, and means for adjusting $x$ to maintain the modified signal representing $\dot{y}-kx$ substantially zero, whereby the amplitude $x$ is approximately proportional to the rate of change of the amplitude $y$.

3. Apparatus for measuring the rate of change of amplitude of an alternating voltage of amplitude $y$, comprising means for setting up an alternating voltage of amplitude $x$, means for multiplying the voltage of amplitude $x$ by a plurality of different numerical factors $z_1, z_2 \ldots z_n$ including both positive and negative factors and each having a constant negative rate of change, means for adding each product so formed to the voltage of amplitude $y$, means for rectifying the resultant sums, differentiating means responsive to the output of the rectifying means to form signals representing the quantities $\dot{y} - kx + \dot{x}z_r$ for $r$ equals $1, 2 \ldots n$, being the constant equal to the modulus of the rate of change of $z$, means for interpolating among the signals representing $$\dot{y} - kx + \dot{x}z_r$$

to derive the signal representing $\dot{y} - kx$, and means for adjusting $x$ to tend to maintain the signal representing $\dot{y} - kx$ substantially zero, whereby the amplitude $x$ is approximately proportional to the rate of change of the amplitude $y$.

4. Apparatus according to claim 3 wherein said means for multiplying the voltage of amplitude $x$ with the factors $z_1, z_2 \ldots z_n$ comprises an autotransformer, means for applying the voltage $x$ between fixed points on the autotransformer, and a plurality of spaced contacts arranged to scan the autotransformer simultaneously at a constant rate, whereby the voltages set up at the spaced contacts are representative of the products $xz_1, xz_2 \ldots xz_n$.

5. Apparatus according to claim 4 wherein the means for adding each voltage to the amplitude $y$ comprises a transformer for injecting the voltage of amplitude $y$ at both ends of said voltage transformer.

6. Apparatus according to claim 5, wherein said means for interpolating comprises an autotransformer having a plurality of spaced contacts for scanning said second-mentioned autotransformer and ganged with the first-mentioned spaced contacts so as to correspond respectively to the factors $z_1, z_2 \ldots z_n$, means for applying the signals representing the quantities $\dot{y} - kx + \dot{x}z_r$ for $r$ equals $1, 2 \ldots n$ to the second-mentioned spaced contacts, and a tap on said second-mentioned potentiometer at a point corresponding to $z$ equal to zero.

7. Apparatus according to claim 2 wherein the means for setting up the voltage of amplitude $x$ comprises a further autotransformer, means for applying an alternating reference voltage of fixed amplitude between fixed points on said further autotransformer, and a movable contact driven by said means for adjusting voltage of amplitude $x$.

8. Apparatus for measuring the rate of change of amplitude of a first alternating voltage, comprising means for setting up a second alternating voltage, means for multiplying said second voltage by a factor having a predetermined constant rate of change, means for rectifying said first voltage and the product of said factor and said second voltage, differentiating means responsive to the output of said rectifying means, and means responsive to the output of said differentiating means for adjusting the amplitude of said second voltage to balance the rate of change of amplitude of said second voltage with the rate of change of amplitude of said product, whereby the amplitude of said second voltage is caused to be approximately proportional to the rate of change of amplitude of said first voltage.

References Cited in the file of this patent

UNITED STATES PATENTS 2,367,746  Williams _____ Jan. 23, 1945